United States Patent
Chen et al.

(10) Patent No.: US 10,721,666 B2
(45) Date of Patent: Jul. 21, 2020

(54) MULTI-MEMBER BLUETOOTH DEVICE CAPABLE OF AVOIDING SIGNAL INTERRUPT AND RELATED MAIN BLUETOOTH CIRCUIT AND AUXILIARY BLUETOOTH CIRCUIT

(71) Applicant: Realtek Semiconductor Corp., Hsinchu (TW)

(72) Inventors: Yi-Cheng Chen, Hsinchu (TW); Kuan-Chung Huang, Taipei (TW); Chia-Chun Hung, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 0 days.

(21) Appl. No.: 16/381,814

(22) Filed: Apr. 11, 2019

(65) Prior Publication Data
US 2019/0320370 A1 Oct. 17, 2019

(30) Foreign Application Priority Data
Apr. 13, 2018 (TW) .............................. 107112825 A

(51) Int. Cl.
*H04W 36/18* (2009.01)
*H04W 52/02* (2009.01)
(Continued)

(52) U.S. Cl.
CPC ....... *H04W 36/18* (2013.01); *H04W 52/0261* (2013.01); *H04W 84/20* (2013.01); *H04W 88/04* (2013.01)

(58) Field of Classification Search
CPC .............. H04R 2420/07; H04R 1/1041; H04R 1/1016; H04R 1/1025; H04R 5/033;
(Continued)

(56) References Cited

U.S. PATENT DOCUMENTS

| 8,768,252 B2 | 7/2014 | Watson et al. |
| 9,020,437 B2 | 4/2015 | Watson et al. |

(Continued)

FOREIGN PATENT DOCUMENTS

| CN | 101836402 B | 5/2013 |
| CN | 106535081 A | 3/2017 |

(Continued)

OTHER PUBLICATIONS

Notice of Allowance of Office Action Taiwanese Application No. 107112825, dated Jan. 14, 2019.
(Continued)

*Primary Examiner* — Golam Sorowar
(74) *Attorney, Agent, or Firm* — Birch, Stewart, Kolasch & Birch, LLP

(57) ABSTRACT

A multi-member Bluetooth device includes: a main Bluetooth circuit capable of directly communicating with a remote Bluetooth device through a Bluetooth transmission approach; and an auxiliary Bluetooth circuit capable of indirectly communicating with the remote Bluetooth device through the main Bluetooth circuit. After operating for a certain period, the main Bluetooth circuit transmits the main Bluetooth circuit's device identification data and multiple Bluetooth connection parameters between the main Bluetooth circuit and the remote Bluetooth device to the auxiliary Bluetooth circuit. When received instructions from the main Bluetooth circuit, the auxiliary Bluetooth circuit utilizes the device identification data and the multiple Bluetooth connection parameters transmitted from the main Bluetooth circuit to directly communicate with the remote Bluetooth device through a Bluetooth transmission approach by imitating the main Bluetooth circuit, and the main Bluetooth circuit then indirectly communicates with the (Continued)

remote Bluetooth device through the auxiliary Bluetooth circuit.

13 Claims, 4 Drawing Sheets

(51) Int. Cl.
*H04W 84/20* (2009.01)
*H04W 88/04* (2009.01)

(58) Field of Classification Search
CPC ............ H04R 1/1091; H04R 2201/107; H04R 2460/03; H04R 1/083; H04R 2420/03; H04R 2420/05; H04R 2499/11; H04R 3/12; H04R 5/04; H04W 4/80; H04W 84/18; H04W 84/20; H04W 12/003; H04W 12/00403; H04W 12/04; H04W 28/18; H04W 48/16; H04W 4/023; H04W 4/025; H04W 76/00; H04W 76/14; H04W 76/15; H04W 76/20; H04W 76/30; H04W 84/10; H04W 88/04
See application file for complete search history.

(56) References Cited

U.S. PATENT DOCUMENTS

| | | | |
|---|---|---|---|
| 9,621,987 | B2 | 4/2017 | Watson et al. |
| 9,788,117 | B2 | 10/2017 | Watson et al. |
| 10,200,791 | B1* | 2/2019 | Liu .................. H04R 5/033 |
| 2011/0169654 | A1 | 7/2011 | Ketari |
| 2012/0058727 | A1 | 3/2012 | Cook et al. |
| 2016/0112825 | A1* | 4/2016 | Miller .................. H04W 12/04 455/41.2 |
| 2017/0093613 | A1 | 3/2017 | Albrecht et al. |
| 2018/0077493 | A1 | 3/2018 | Watson et al. |
| 2018/0184234 | A1 | 6/2018 | Chen et al. |

FOREIGN PATENT DOCUMENTS

| | | |
|---|---|---|
| CN | 107071618 A | 8/2017 |
| JP | 2003-273883 A | 9/2003 |
| JP | 2004-15136 A | 1/2004 |
| JP | 2004-350010 A | 12/2004 |

OTHER PUBLICATIONS

Korean Office Action dated Oct. 21, 2019 forApplication No. 10-2019-0043162, along with an English translation.
Taiwanese Office Action and Search Report for Taiwanese Application No. 108108851, dated Jan. 8, 2020, with partial English translation.
Taiwanese Office Action and Search Report for Taiwanese Application No. 108108852, dated Jan. 7, 2020, with partial English translation.
U.S. Office Action for U.S. Appl. No. 16/381,666, dated Jan. 30, 2020.
Japanese Office Action dated Feb. 12, 2020 for Application No. 2019-077166, along with an English translation.
Japanese Office Action dated Feb. 18, 2020 for Application No. 2019-076259, along with an English translation.
Japanese Office Action dated Feb. 18, 2020 for Application No. 2019-076295, along with an English translation.
Japanese Office Action dated Feb. 4, 2020 for Application No. 2019-076280, along with an English translation.

* cited by examiner

MULTI-MEMBER BLUETOOTH DEVICE CAPABLE OF AVOIDING SIGNAL INTERRUPT AND RELATED MAIN BLUETOOTH CIRCUIT AND AUXILIARY BLUETOOTH CIRCUIT

CROSS-REFERENCE TO RELATED APPLICATIONS

This application claims the benefit of priority to Patent Application No. TW 107112825, filed in Taiwan on Apr. 13, 2018; the entirety of which is incorporated herein by reference for all purposes.

BACKGROUND

The disclosure generally relates to a Bluetooth device and, more particularly, to a multi-member Bluetooth device capable of avoiding signal interrupt and related main Bluetooth circuit and auxiliary Bluetooth circuit.

A multi-member Bluetooth device is a Bluetooth device formed by multiple Bluetooth circuits cooperating with each other, such as, a pair of Bluetooth earphones, a group of Bluetooth speakers, or the like. When the multi-member Bluetooth device connects to other Bluetooth devices (hereinafter, the remote Bluetooth device), the remote Bluetooth device treats the multi-member Bluetooth device as a single Bluetooth device. In operations, conventional multi-member Bluetooth device appoints one of the member circuits to be a signal relay circuit, so that the signal relay circuit acts as a data communication bridge between the remote Bluetooth device and other member circuits.

In operations, the signal relay circuit's computing loading is higher than other member circuits, and thus the signal relay circuit typically has higher power consumption and generates more heats than other member circuits. When the signal relay circuit is difficult to continue acting as the data communication bridge between the remote Bluetooth device and other member circuits due to lack of power or other reasons, the conventional multi-member Bluetooth device would appoint another member circuit to be a new signal relay circuit, and the new signal relay circuit would reestablish a new Bluetooth connection with the remote Bluetooth device. After the new signal relay circuit reestablished the new Bluetooth connection, all of the member circuits in the multi-member Bluetooth device then communicate data with the remote Bluetooth device through the new signal relay circuit.

However, before the new Bluetooth connection between the new signal relay circuit and the remote Bluetooth device is established, other member circuits may be unable to communicate data with the remote Bluetooth device for a while and thus encounter signal interruption problem. For example, in the application scenario of the Bluetooth earphones, one of the Bluetooth earphones may encounter audio interruption under such situation, thereby causing poor experiences to the user.

SUMMARY

An example embodiment of a multi-member Bluetooth device for communicating data with a remote Bluetooth device is disclosed, comprising: a main Bluetooth circuit, comprising: a first Bluetooth communication circuit; a first data transmission circuit; and a first control circuit arranged to operably communicate data with the remote Bluetooth device through the first Bluetooth communication circuit by utilizing a Bluetooth wireless transmission approach, and arranged to operably communicate data with other devices through the first data transmission circuit; and an auxiliary Bluetooth circuit, comprising: a second Bluetooth communication circuit; a second data transmission circuit; and a second control circuit arranged to operably control the second data transmission circuit to communicate data with the first data transmission circuit, so as to indirectly communicate data with the remote Bluetooth device through the main Bluetooth circuit; wherein the first control circuit transmits a device identification data of the main Bluetooth circuit and multiple Bluetooth connection parameters between the main Bluetooth circuit and the remote Bluetooth device to the second data transmission circuit through the first data transmission circuit; when the second control circuit received instructions from the main Bluetooth circuit, the second control circuit controls the second Bluetooth communication circuit to directly communicate data with the remote Bluetooth device in the name of the main Bluetooth circuit by utilizing the device identification data and the multiple Bluetooth connection parameters; and the first control circuit then controls the first data transmission circuit to communicate data with the second data transmission circuit, so as to indirectly communicate data with the remote Bluetooth device through the auxiliary Bluetooth circuit.

An example embodiment of a main Bluetooth circuit of a multi-member Bluetooth device is disclosed. The multi-member Bluetooth device is utilized for communicating data with a remote Bluetooth device and comprising the main Bluetooth circuit and an auxiliary Bluetooth circuit. The main Bluetooth circuit comprises: a Bluetooth communication circuit; a data transmission circuit; and a control circuit arranged to operably communicate data with the remote Bluetooth device through the Bluetooth communication circuit by utilizing a Bluetooth wireless transmission approach, and arranged to operably communicate data with the auxiliary Bluetooth circuit through the data transmission circuit, so that the auxiliary Bluetooth circuit is allowed to indirectly communicate data with the remote Bluetooth device through the main Bluetooth circuit; wherein the control circuit transmits a device identification data of the main Bluetooth circuit and multiple Bluetooth connection parameters between the main Bluetooth circuit and the remote Bluetooth device to the auxiliary Bluetooth circuit through the data transmission circuit, so as to enable the auxiliary Bluetooth circuit to directly communicate data with the remote Bluetooth device in the name of the main Bluetooth circuit by utilizing the device identification data and the multiple Bluetooth connection parameters; and the control circuit then indirectly communicates data with the remote Bluetooth device through the auxiliary Bluetooth circuit.

An example embodiment of an auxiliary Bluetooth circuit of a multi-member Bluetooth device is disclosed. The multi-member Bluetooth device is utilized for communicating data with a remote Bluetooth device and comprising the auxiliary Bluetooth circuit and a main Bluetooth circuit. The auxiliary Bluetooth circuit comprises: a Bluetooth communication circuit; a data transmission circuit; and a control circuit arranged to operably control the data transmission circuit to communicate data with the main Bluetooth circuit, so as to indirectly communicate data with the remote Bluetooth device through the main Bluetooth circuit; wherein the data transmission circuit receives multiple Bluetooth connection parameters between the main Bluetooth circuit and the remote Bluetooth device and a device identification data transmitted from the main Bluetooth circuit; when the control circuit received instructions from the main Bluetooth circuit, the control circuit controls the Bluetooth communication circuit to directly communicate data with the remote Bluetooth device in the name of the main Bluetooth circuit by utilizing the device identification data and the multiple Bluetooth connection parameters; and the main Bluetooth circuit then indirectly communicates data with the remote Bluetooth device through the auxiliary Bluetooth circuit.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
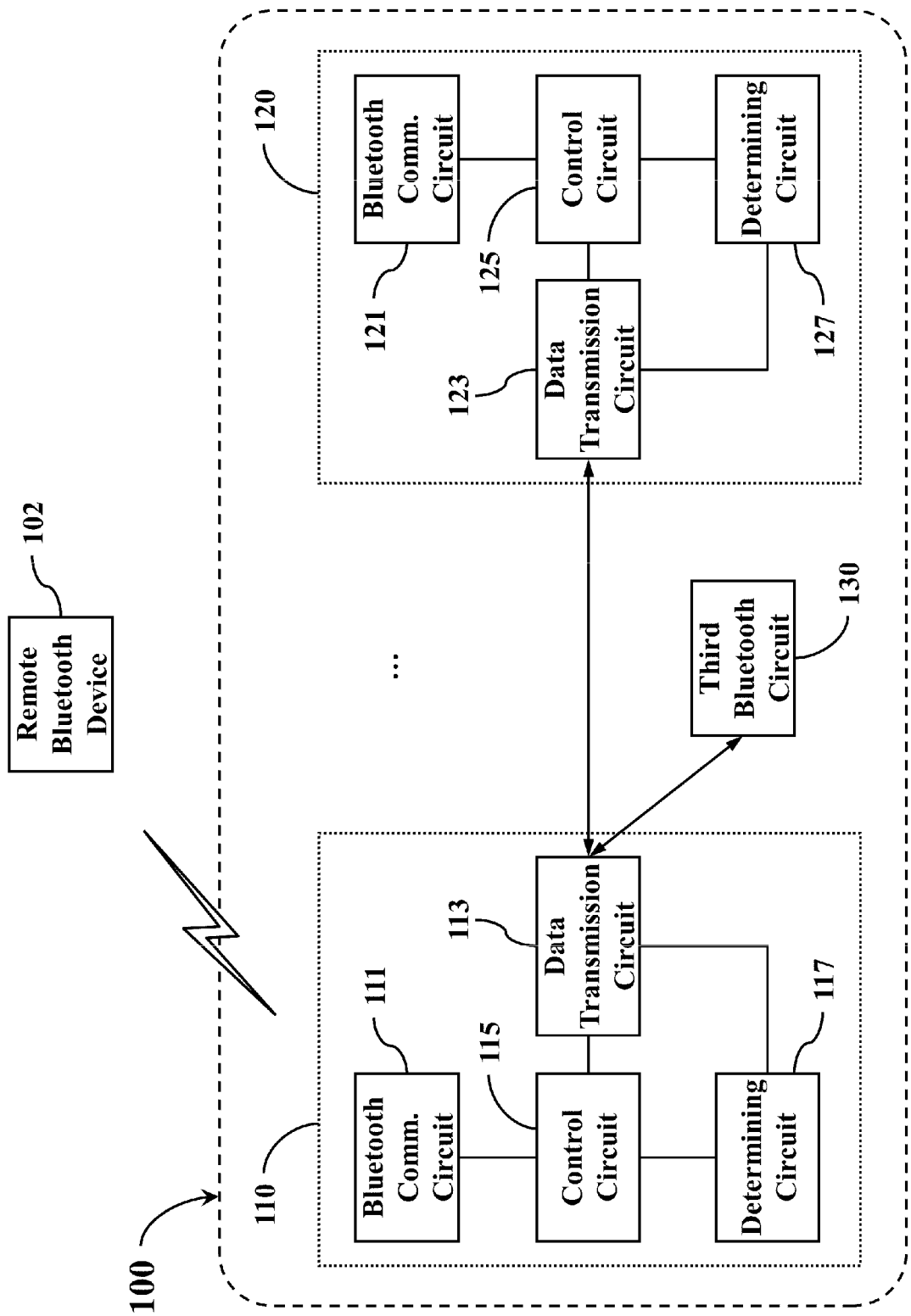
FIG. 1 shows a simplified functional block diagram of a multi-member Bluetooth device according to one embodiment of the present disclosure.

FIG. 1 shows a simplified functional block diagram of a multi-member Bluetooth device 100 according to one embodiment of the present disclosure. The multi-member Bluetooth device 100 is arranged to operably conduct data transmission with a remote Bluetooth device 102 and comprises multiple member circuits. For the purpose of explanatory convenience in the following description, only a first Bluetooth circuit 110, a second Bluetooth circuit 120, and a third Bluetooth circuit 130 are shown in the embodiment of FIG. 1.

In this embodiment, all of the member circuits in the multi-member Bluetooth device 100 have a similar main circuit structure, but different member circuits may be provided with different additional circuit components. That is, it does not require all member circuits to have completely identical circuitry structure with each other. For example, as shown in FIG. 1, the first Bluetooth circuit 110 comprises a Bluetooth communication circuit 111, a data transmission circuit 113, a control circuit 115, and a determining circuit 117. Similarly, the second Bluetooth circuit 120 comprises a Bluetooth communication circuit 121, a data transmission circuit 123, a control circuit 125, and a determining circuit 127.

The main circuit structure of the Bluetooth circuit 130 is similar to the aforementioned Bluetooth circuit 110 or 120, but for the sake of brevity, the circuitry components inside the Bluetooth circuit 130 are not shown in FIG. 1.

In the first Bluetooth circuit 110, the Bluetooth communication circuit 111 is arranged to operably communicate data with other Bluetooth devices. The data transmission circuit 113 is arranged to operably communicate data with other member circuits.

The control circuit 115 is coupled with the Bluetooth communication circuit 111 and the data transmission circuit 113. The control circuit 115 is arranged to operably communicate data with the remote Bluetooth device 102 through the Bluetooth communication circuit 111 by utilizing a Bluetooth wireless transmission approach, and arranged to operably communicate data with other member circuits through the data transmission circuit 113.

The determining circuit 117 is coupled with the control circuit 115. The determining circuit 117 is arranged to operably evaluate a computing loading, a remaining power, a temperature, or an operating environment of the first Bluetooth circuit 110, and arranged to operably notify the control circuit 115 when the above operating parameters of the first Bluetooth circuit 110 match predetermined conditions.

In some embodiments, the determining circuit 117 is further coupled with the data transmission circuit 113 to receive indication messages regarding a computing loading, a remaining power, a temperature, or an operating environment of other member circuits transmitted from other member circuits (e.g., the Bluetooth circuit 120 or the Bluetooth circuit 130 in FIG. 1) through the data transmission circuit 113.

In the second Bluetooth circuit 120, the Bluetooth communication circuit 121 is arranged to operably communicate data with other Bluetooth devices. The data transmission circuit 123 is arranged to operably communicate data with other member circuits.

The control circuit 125 is coupled with the Bluetooth communication circuit 121 and the data transmission circuit 123. The control circuit 125 is arranged to operably communicate data with other Bluetooth devices through the Bluetooth communication circuit 121 by utilizing a Bluetooth wireless transmission approach, and arranged to operably communicate data with other member circuits through the data transmission circuit 123.

The determining circuit 127 is coupled with the control circuit 125. The determining circuit 127 is arranged to operably evaluate a computing loading, a remaining power, a temperature, or an operating environment of the second Bluetooth circuit 120, and arranged to operably notify the control circuit 125 when the above operating parameters of the second Bluetooth circuit 120 match predetermined conditions.

In some embodiments, the determining circuit 127 is further coupled with the data transmission circuit 123 to receive indication messages regarding a computing loading, a remaining power, a temperature, or an operating environment of other member circuits transmitted from other member circuits (e.g., the Bluetooth circuit 110 or 130 in FIG. 1) through the data transmission circuit 123.

In practice, each of the aforementioned Bluetooth communication circuits 111 and 121 may be realized with suitable communication circuits capable of supporting various versions of the Bluetooth communication protocols. Each of the aforementioned data transmission circuits 113 and 123 may be realized with a wired transmission circuit, a wireless transmission circuits or a hybrid circuit integrating above two transmission mechanisms. Each of the aforementioned control circuits 115 and 125 may be realized with various microprocessors or digital signal processing circuits having appropriate computing abilities. Each of the aforementioned determining circuits 117 and 127 may be realized with appropriate circuits capable of sensing, collecting, recording, and comparing related operating parameters.

In some embodiments, the determining circuit 117 or 127 may be integrated into the control circuit 115 or 125. In addition, the data transmission circuits 113 and 123 may be respectively integrated into the Bluetooth communication circuits 111 and 121. Alternatively, the Bluetooth communication circuits 111 and 121 may be respectively utilized to realize the functionalities of the data transmission circuits 113 and 123.

In other words, the Bluetooth communication circuit 111 and the data transmission circuit 113 may be realized with separate circuits, or may be integrated into a single circuit. Similarly, the Bluetooth communication circuit 121 and the data transmission circuit 123 may be realized with separate circuits, or may be integrated into a single circuit.

In practical applications, different functional blocks of the aforementioned first Bluetooth circuit 110 may be integrated into a single circuit chip. For example, all functional blocks of the first Bluetooth circuit 110 may be integrated into a single Bluetooth controller IC. Similarly, all functional blocks of the second Bluetooth circuit 120 may be integrated into another Bluetooth controller IC.

As can be appreciated from the foregoing descriptions that different member circuits of the multi-member Bluetooth device 100 may communicate data with each other through respective data transmission circuit by using various wired or wireless transmission mechanisms, so as to form various types of data network or data link. When the multi-member Bluetooth device 100 communicates data with the remote Bluetooth device 102, only a particular member circuit out of the multiple member circuits of the multi-member Bluetooth device 100 is responsible for directly communicating data with the remote Bluetooth device 102, while other member circuits indirectly communicate data with the remote Bluetooth device 102 through the particular member circuit. Therefore, the remote Bluetooth device 102 would treat the multi-member Bluetooth device 100 as a single Bluetooth device.

Figure 2:
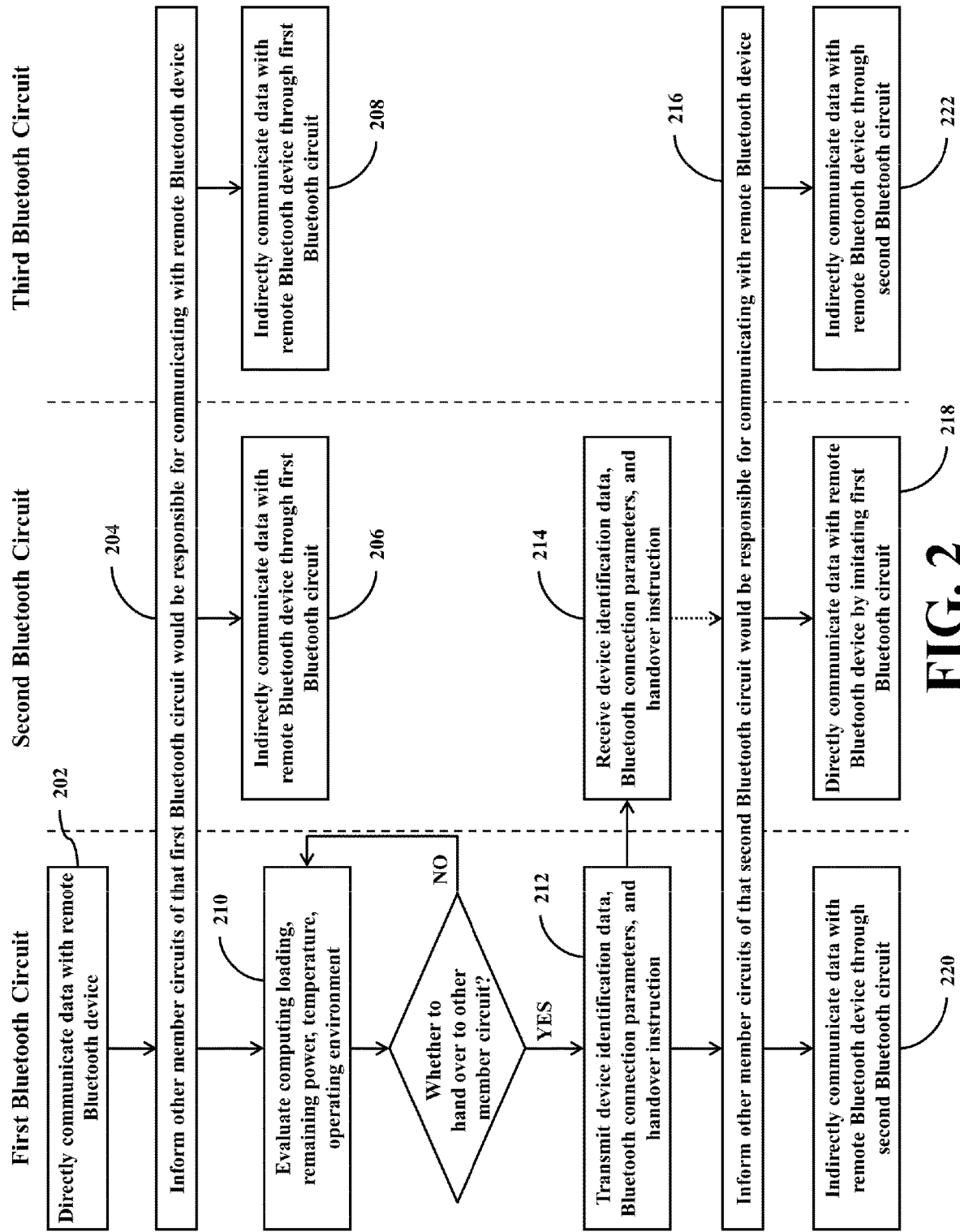
FIG. 2 shows a simplified flowchart illustrating a method of seamless handover between different member circuits of the multi-member Bluetooth device according to the present disclosure.
Figure 3:
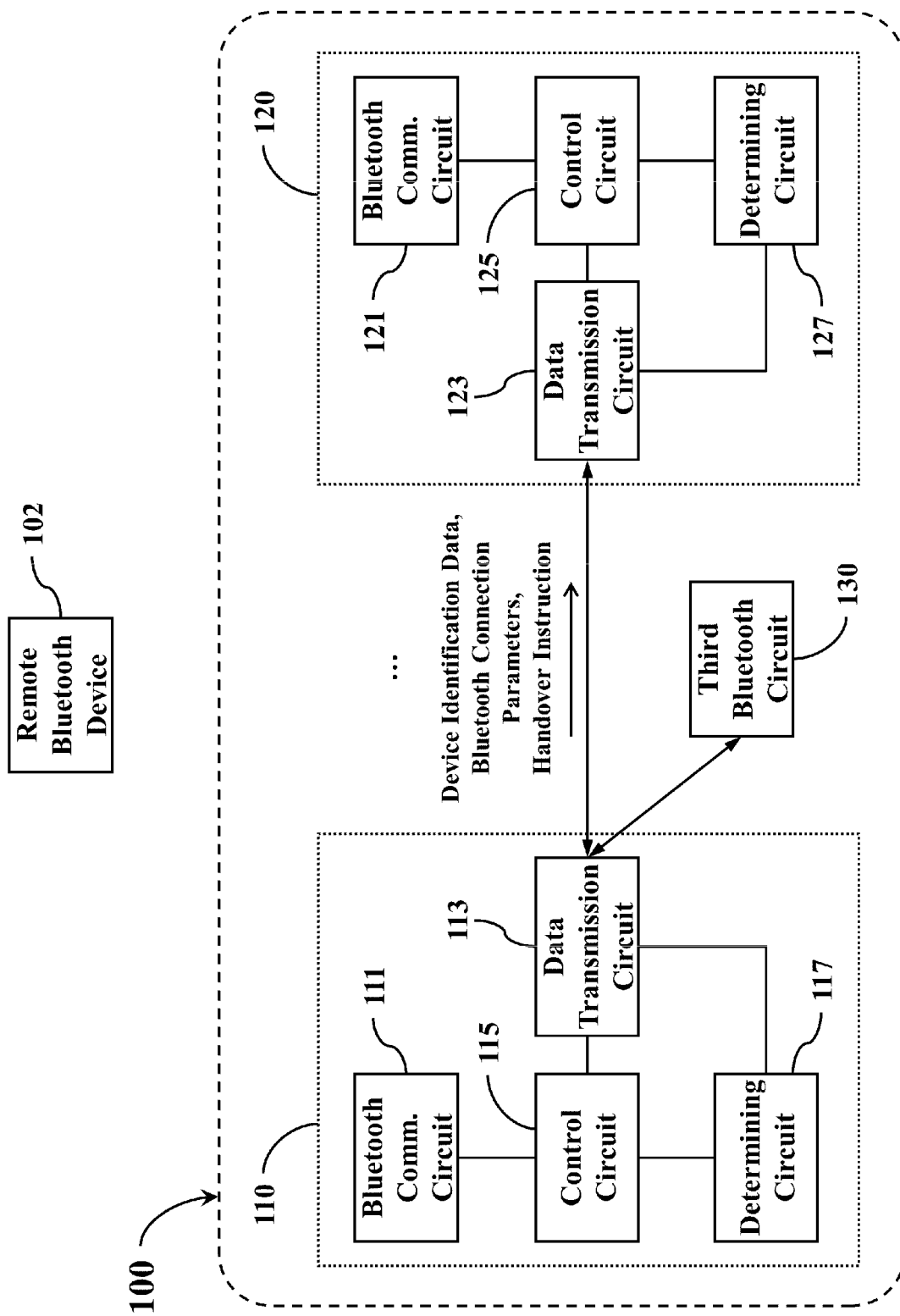
FIG. 3 and FIG. 4 show simplified schematic diagrams of the operation of the multi-member Bluetooth device of FIG. 1 in different operation stages.
Figure 4:
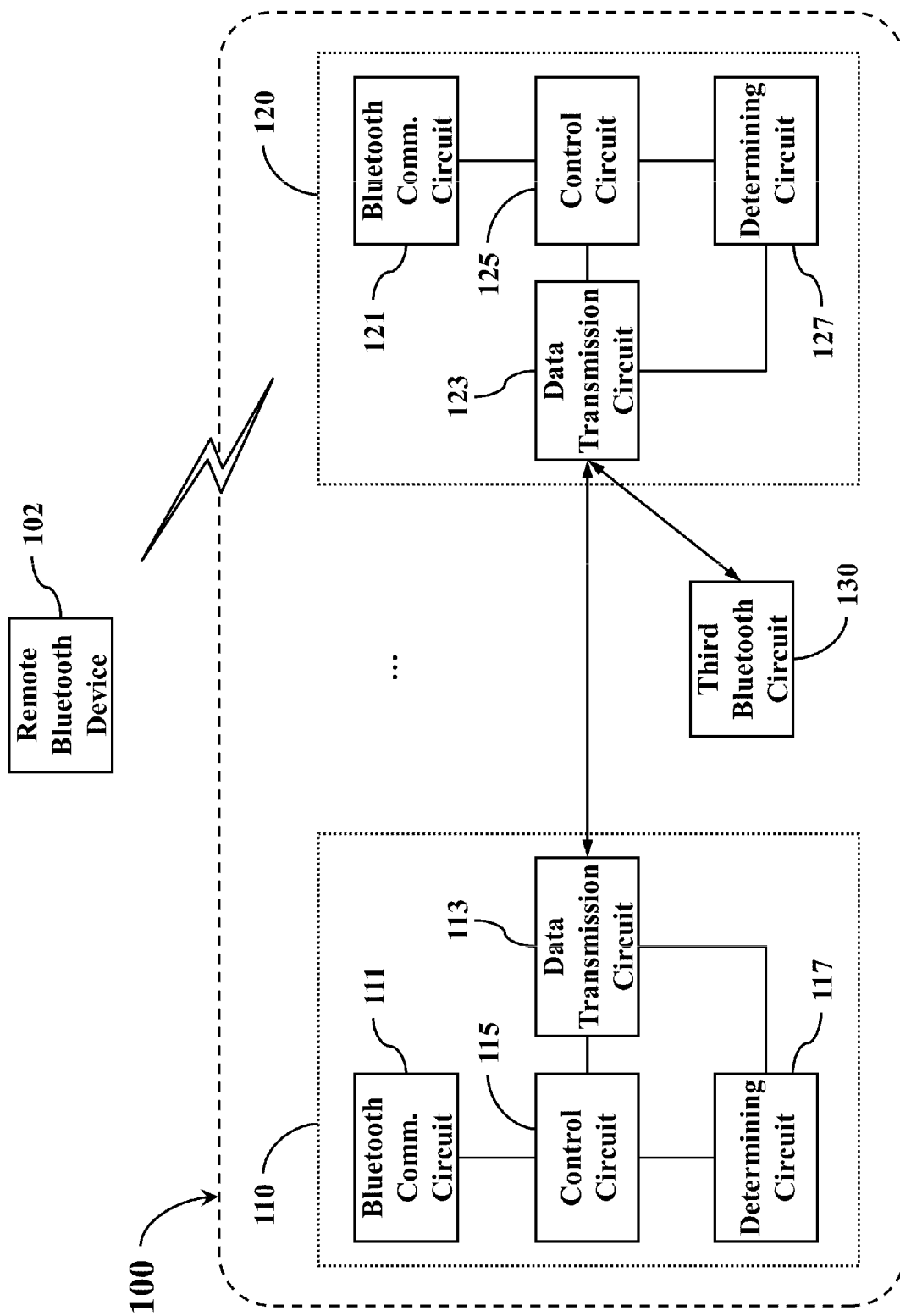

The operations of the multi-member Bluetooth device 100 will be further described below with reference to FIG. 2 to FIG. 4. FIG. 2 shows a simplified flowchart illustrating a method of seamless handover between different member circuits of the multi-member Bluetooth device 100 according to the present disclosure. FIG. 3 and FIG. 4 show simplified schematic diagrams of the operation of the multi-member Bluetooth device 100 in different operation stages.

In the flowchart shown in FIG. 2, operations within a column under the name of a specific device are operations to be performed by the specific device. For example, operations within a column under the label "first Bluetooth circuit" are operations to be performed by the first Bluetooth circuit 110; operations within a column under the label "second Bluetooth circuit" are operations to be performed by the second Bluetooth circuit 120; operations within a column under the label "third Bluetooth circuit" are operations to be performed by the third Bluetooth circuit 130.

For the purpose of explanatory convenience in the following description, it is assumed hereinafter that the member circuit preselected from the multi-member Bluetooth device 100 to be responsible for conducting Bluetooth communication with external Bluetooth devices is the first Bluetooth circuit 110.

In the operation 202, the first Bluetooth circuit 110 directly communicates data with the remote Bluetooth device 102 as shown in FIG. 1. For example, the control circuit 115 may control the Bluetooth communication circuit 111 to establish a Bluetooth connection with the remote Bluetooth device 102 in the operation 202 so as to directly conduct a bidirectional data communication with the remote Bluetooth device 102. For another example, the control circuit 115 may control the Bluetooth communication circuit 111 to operate in the advertising mode to unidirectionally transmit data to the remote Bluetooth device 102 in the operation 202. For yet another example, the control circuit 115 may control the Bluetooth communication circuit 111 to operate in an appropriate Bluetooth packet receiving mode to unidirectionally receive data transmitted from the remote Bluetooth device 102 in the operation 202.

In other words, the data communication between the first Bluetooth circuit 110 and the remote Bluetooth device 102 may be bidirectional, or may be unidirectional.

In the operation 204, the first Bluetooth circuit 110 informs other member circuits of the multi-member Bluetooth device 100 of that the first Bluetooth circuit 110 would be responsible for communicating with the remote Bluetooth device 102. That is, the first Bluetooth circuit 110 would act as the data communication bridge between the remote Bluetooth device 102 and other member circuits in the subsequent operations. In the operation 204, the control circuit 115 may transmit related notification message to data transmission circuits of other member circuits through the data transmission circuit 123.

Afterwards, the second Bluetooth circuit 120 performs the operation 206 when the second Bluetooth circuit 120 needs to receive data transmitted from the remote Bluetooth device 102 or needs to transmit data to the remote Bluetooth device 102. Similarly, the third Bluetooth circuit 130 performs the operation 208 when the third Bluetooth circuit 130 needs to receive data transmitted from the remote Bluetooth device 102, or needs to transmit data to the remote Bluetooth device 102.

In the operation 206, the second Bluetooth circuit 120 indirectly communicates data with the remote Bluetooth device 102 through the first Bluetooth circuit 110. For example, the control circuit 125 of the second Bluetooth circuit 120 may transmit a data to be transmitted to the remote Bluetooth device 102 to the data transmission circuit 113 of the first Bluetooth circuit 110 through the data transmission circuit 123, and then the first Bluetooth circuit 110 would forward the data to the remote Bluetooth device 102. For another example, the control circuit 125 of the second Bluetooth circuit 120 may receive a data transmitted from the remote Bluetooth device 102 through the first Bluetooth circuit 110.

In the operation 208, the third Bluetooth circuit 130 indirectly communicates data with the remote Bluetooth device 102 through the first Bluetooth circuit 110. For example, the third Bluetooth circuit 130 may transmit a data to be transmitted to the remote Bluetooth device 102 to the data transmission circuit 113 of the first Bluetooth circuit 110, and then the first Bluetooth circuit 110 would forward the data to the remote Bluetooth device 102. For another example, the third Bluetooth circuit 130 may receive a data transmitted from the remote Bluetooth device 102 through the first Bluetooth circuit 110.

As a result, during the operation of the multi-member Bluetooth device 100, the first Bluetooth circuit 110 is the only member circuit that directly communicates data with the remote Bluetooth device 102, and each of the other member circuits would indirectly communicate data with the remote Bluetooth device 102 through the first Bluetooth circuit 110. In other words, the first Bluetooth circuit 110 acts as a signal relay device between other member circuits and the remote Bluetooth device 102 at this time.

In the environment where all member circuits of the multi-member Bluetooth device 100 are battery-powered circuits, the aforementioned mechanism reduces the computing loading, power consumption, and heat generation of other member circuits.

During the operation of the multi-member Bluetooth device 100, the determining circuit 117 of the first Bluetooth circuit 110 may periodically or intermittently perform the operation 210.

In the operation 210, the determining circuit 117 evaluates the operating parameters (such as a computing loading, a remaining power, a temperature, and/or an operating environment) of the first Bluetooth circuit 110 to determine whether the first Bluetooth circuit 110 needs to hand over its role of signal relay device to other member circuits. If the determining circuit 117 determines that a current situation of the first Bluetooth circuit 110 matches predetermined conditions, then the first Bluetooth circuit 110 performs the operation 212. Otherwise, the determining circuit 117 continues repeating the operation 210 periodically or intermittently.

For example, the determining circuit 117 may determine that the first Bluetooth circuit 110 needs to hand over the role of signal relay device to other member circuits only in the case that the computing loading of the first Bluetooth circuit 110 exceeds a predetermined level, the remaining power of the first Bluetooth circuit 110 is below a predetermined level, the temperature of the first Bluetooth circuit 110 exceeds a predetermined temperature, and the operating environment of the first Bluetooth circuit 110 deviates from a predetermined condition. In some embodiments where the first Bluetooth circuit 110 is a Bluetooth earphone, the predetermined condition of the operating environment of the first Bluetooth circuit 110 is that the first Bluetooth circuit 110 should operate inside the external auditory canal of the user. In this situation, the determining circuit 117 may determine that the operating environment of the first Bluetooth circuit 110 deviates from predetermined conditions when the determining circuit 117 has sensed that the position of the first Bluetooth circuit 110 leaves the user's ear.

For another example, the determining circuit 117 may determine that the first Bluetooth circuit 110 needs to hand over the role of signal relay device to other member circuits when the first Bluetooth circuit 110 matches at least one of the above conditions.

In another embodiment, the determining circuit 117 may receive indication messages of other member circuit's operating parameters (such as the computing loading, the remaining power, the temperature, or the operating environment) transmitted from other member circuits (e.g., the Bluetooth circuit 120 and 130 in FIG. 1) through the data transmission circuit 113 in the operation 210. The determining circuit 117 may compare the operating parameters of the first Bluetooth circuit 110 with corresponding operating parameters of other member circuits, and utilize the comparing result as a reference basis of determining whether the first Bluetooth circuit 110 needs to hand over the role of signal relay device to other member circuits. In this embodiment, other member circuits may utilize their determining circuit to evaluate their own operating parameters, such as the computing loading, the remaining power, the temperature, and/or the operating environment, and transmit the obtained operating parameters to the determining circuit 117 of the first Bluetooth circuit 110 in the operation 210.

For example, the determining circuit 117 may determine that the first Bluetooth circuit 110 needs to hand over the role of signal relay device to other member circuits only in the case that the computing loading of the first Bluetooth circuit 110 exceeds the computing loading of other member circuit to a predetermined degree, the remaining power of the first Bluetooth circuit 110 is below the remaining power of other member circuit to a predetermined degree, the temperature of the first Bluetooth circuit 110 exceeds the temperature of other member circuit to a predetermined degree, and the operating environment of the first Bluetooth circuit 110 deviates from corresponding predetermined conditions but the operating environment of other member circuit matches corresponding predetermined conditions.

For another example, the determining circuit 117 may determine that the first Bluetooth circuit 110 needs to hand over the role of signal relay device to other member circuits when the first Bluetooth circuit 110 matches at least one of the above conditions.

In practice, the determining circuit 117 may take both the aforementioned operating parameters of the first Bluetooth circuit 110 and the difference between operating parameters of the first Bluetooth circuit 110 and corresponding operating parameters of other member circuits into consideration in the aforementioned operation 210.

For example, the determining circuit 117 may determine that the first Bluetooth circuit 110 needs to hand over the role of signal relay device to other member circuits only in the case that the computing loading of the first Bluetooth circuit 110 exceeds a predetermined level, the remaining power of the first Bluetooth circuit 110 is below a predetermined level, the temperature of the first Bluetooth circuit 110 exceeds a predetermined temperature, the computing loading of the first Bluetooth circuit 110 exceeds the computing loading of other member circuit to a predetermined degree, the remaining power of the first Bluetooth circuit 110 is below the remaining power of other member circuit to a predetermined degree, the temperature of the first Bluetooth circuit 110 exceeds the temperature of other member circuit to a predetermined degree, and the operating environment of the first Bluetooth circuit 110 deviates from corresponding predetermined conditions but the operating environment of other member circuit matches corresponding predetermined conditions Alternatively, the determining circuit 117 may determine that the first Bluetooth circuit 110 needs to hand over the role of signal relay device to other member circuits when the first Bluetooth circuit 110 matches at least a portion of the above conditions.

When the determining circuit 117 determines that the first Bluetooth circuit 110 needs to hand over the role of signal relay device to other member circuits, the determining circuit 117 notifies the control circuit 115 so that the control circuit 115 performs the operation 212.

In the operation 212, the control circuit 115 may select one member circuit from other member circuits of the multi-member Bluetooth device 100 to play the role of signal relay device in the subsequent operation, and transmit a device identification data of the first Bluetooth circuit 110, the Bluetooth connection parameters between the first Bluetooth circuit 110 and the remote Bluetooth device 102, and a handover instruction to the selected member circuit through the data transmission circuit 113.

In practice, the control circuit 115 may select any member circuit from other member circuits of the multi-member Bluetooth device 100 to play the role of signal relay device in the subsequent operation.

Alternatively, the control circuit 115 may select a member circuit having the greatest operating parameters from other member circuits of the multi-member Bluetooth device 100 to play the role of signal relay device in the subsequent operation.

For example, the control circuit 115 may select a member circuit having the highest remaining power from other member circuits of the multi-member Bluetooth device 100 to play the role of signal relay device in the subsequent operation.

For another example, the control circuit 115 may select a member circuit having the lowest average computing loading from other member circuits of the multi-member Bluetooth device 100 to play the role of signal relay device in the subsequent operation.

For yet another example, the control circuit 115 may select a member circuit having the lowest temperature from other member circuits of the multi-member Bluetooth device 100 to play the role of signal relay device in the subsequent operation.

For yet another example, the control circuit 115 may respectively set an appropriate weight for multiple operating parameters of other member circuits, and select a member circuit having the highest weighted score to play the role of signal relay device in the subsequent operation.

For the purpose of explanatory convenience in the following description, it is assumed hereinafter that the control circuit 115 selects the second Bluetooth circuit 120 to play the role of signal relay device in the subsequent operation in the aforementioned operation 212.

Therefore, as shown in FIG. 3, the control circuit 115 transmits the device identification data of the first Bluetooth circuit 110, the Bluetooth connection parameters between the first Bluetooth circuit 110 and the remote Bluetooth device 102, and the handover instruction to the second Bluetooth circuit 120 through the data transmission circuit 113 and the data transmission circuit 123 in the operation 212.

The handover instruction is utilized for instructing the second Bluetooth circuit 120 to directly communicate data with the remote Bluetooth device 102 by imitating the first Bluetooth circuit 110 utilizing the device identification data of the first Bluetooth circuit 110 and the Bluetooth connection parameters of the first Bluetooth circuit 110. That is, the handover instruction is utilized for instructing the second Bluetooth circuit 120 to replace the first Bluetooth circuit 110 by utilizing the device identification data of the first Bluetooth circuit 110 and the Bluetooth connection parameters of the first Bluetooth circuit 110 to directly communicate data with the remote Bluetooth device 102 utilizing a Bluetooth wireless transmission approach, so as to take over the role of signal relay device in the subsequent operation.

In practice, the device identification data of the first Bluetooth circuit 110 transmitted in the aforementioned operation 212 may vary with the version of Bluetooth communication protocols employed between the multi-member Bluetooth device 100 and the remote Bluetooth device 102, or may vary with the Bluetooth communication mode adopted at that time.

For example, in one embodiment, the device identification data of the first Bluetooth circuit 110 comprises a sync word utilized by the first Bluetooth circuit 110, a Bluetooth address of the first Bluetooth circuit 110, and a logical transport address (LT_ADDR) of the first Bluetooth circuit 110.

In another embodiment, the device identification data of the first Bluetooth circuit 110 comprises an access address of the first Bluetooth circuit 110.

In yet another embodiment, the device identification data of the first Bluetooth circuit 110 comprises an access address of the first Bluetooth circuit 110 and an advertising device address of the first Bluetooth circuit 110.

Similarly, the Bluetooth connection parameters transmitted in the aforementioned operation 212 may vary with the version of Bluetooth communication protocols employed between the multi-member Bluetooth device 100 and the remote Bluetooth device 102, or may vary with the Bluetooth communication mode adopted at that time.

For example, in one embodiment, the Bluetooth connection parameters between the first Bluetooth circuit 110 and the remote Bluetooth device 102 comprises a piconet clock and an adaptive frequency hopping map (AFH map).

In another embodiment, the Bluetooth connection parameters between the first Bluetooth circuit 110 and the remote Bluetooth device 102 comprises a piconet clock, an AFH map, a link key, and an encryption key.

In yet another embodiment, the Bluetooth connection parameters between the first Bluetooth circuit 110 and the remote Bluetooth device 102 comprises an advertising interval, a channel map, and a vendor specific timing data.

In yet another embodiment, the Bluetooth connection parameters between the first Bluetooth circuit 110 and the remote Bluetooth device 102 comprises an anchor point instant, a connection counter, a connection interval, a channel map, a long term key, a session key, an initialization vector, a CCM counter, and a vendor specific timing data.

In the operation 214, the control circuit 125 of the second Bluetooth circuit 120 receives the device identification data, the Bluetooth connection parameters, and the handover instruction transmitted from the first Bluetooth circuit 110 through the data transmission circuit 123.

In the operation 216, the first Bluetooth circuit 110 or the second Bluetooth circuit 120 informs other member circuits of the multi-member Bluetooth device 100 of that the second Bluetooth circuit 120 will be responsible for communicating with the remote Bluetooth device 102 in the subsequent operation. That is, the second Bluetooth circuit 120 would act as the data communication bridge between the remote Bluetooth device 102 and other member circuits in the following operation. In the operation 216, the control circuit 115 or 125 may transmit the above notification to the data transmission circuits of other member circuits through corresponding data transmission circuits.

In the operation 218, as shown in FIG. 4, the control circuit 125 of the second Bluetooth circuit 120 controls the Bluetooth communication circuit 121 to directly communicate data with the remote Bluetooth device 102 by imitating the first Bluetooth circuit 110 utilizing the device identification data and the Bluetooth connection parameters of the first Bluetooth circuit 110. Please note that "imitating" the first Bluetooth circuit 110 means that when the second Bluetooth circuit 120 directly conducts Bluetooth communication with the remote Bluetooth device 102, the second Bluetooth circuit 120 utilizes the device identification data of the first Bluetooth circuit 110 as the device identification data of the second Bluetooth circuit 120 on purpose, to thereby render the remote Bluetooth device 102 to believe that the remote Bluetooth device 102 is still conducting Bluetooth communication with the first Bluetooth circuit 110.

On the other hand, when the Bluetooth communication circuit 121 of the second Bluetooth circuit 120 directly communicates data with the remote Bluetooth device 102 in the name of the first Bluetooth circuit 110, the control circuit 115 of the first Bluetooth circuit 110 would control the Bluetooth communication circuit 111 to stop communicating data with the remote Bluetooth device 102 utilizing a Bluetooth wireless transmission approach, so as to avoid the remote Bluetooth device 102 from signal confusion.

In other words, during a period in which the first Bluetooth circuit 110 directly communicates data with the remote Bluetooth device 102 utilizing the Bluetooth communication circuit 111, the Bluetooth communication circuit 121 of the second Bluetooth circuit 120 does not directly communicate data with the remote Bluetooth device 102; while during a period in which the Bluetooth communication circuit 121 of the second Bluetooth circuit 120 directly communicate data with the remote Bluetooth device 102, the Bluetooth communication circuit 111 of the first Bluetooth circuit 110 does not directly communicate data with the remote Bluetooth device 102.

Furthermore, the Bluetooth communication circuit 121 does not need to ask for a permission from the remote Bluetooth device 102 before it directly communicates data with the remote Bluetooth device 102 utilizing a Bluetooth wireless transmission approach in the name of the first Bluetooth circuit 110 by utilizing a device identification data and multiple Bluetooth connection parameters. Therefore, when the second Bluetooth circuit 120 begins to directly conduct Bluetooth communication with the remote Bluetooth device 102, the remote Bluetooth device 102 does not ask the second Bluetooth circuit 120 to reestablish a Bluetooth connection with the remote Bluetooth device 102.

In other words, since the second Bluetooth circuit 120 directly conducts the Bluetooth communication with the remote Bluetooth device 102 by utilizing the device identification data and the Bluetooth connection parameters of the first Bluetooth circuit 110, the second Bluetooth circuit 120 does not need to spend time reestablishing a Bluetooth connection with the remote Bluetooth device 102. For another aspect, the foregoing approach can effectively prevent the second Bluetooth circuit 120 from signal interruption caused by reestablishing Bluetooth connection with the remote Bluetooth device 102 in the name of the second Bluetooth circuit 120.

Afterwards, the first Bluetooth circuit 110 performs the operation 220 when the first Bluetooth circuit 110 needs to receive a data transmitted from the remote Bluetooth device 102 or needs to transmit a data to the remote Bluetooth device 102. Similarly, the third Bluetooth circuit 130 performs the operation 222 when the third Bluetooth circuit 130 needs to receive a data transmitted from the remote Bluetooth device 102 or needs to transmit a data to the remote Bluetooth device 102.

In the operation 220, the first Bluetooth circuit 110 instead indirectly communicates data with the remote Bluetooth device 102 through the second Bluetooth circuit 120. For example, the control circuit 115 of the first Bluetooth circuit 110 may transmit a data to be transmitted to the remote Bluetooth device 102 to the data transmission circuit 123 of the second Bluetooth circuit 120 through the data transmission circuit 113, and then the second Bluetooth circuit 120 would forward the data to the remote Bluetooth device 102. For another example, the control circuit 115 of the first Bluetooth circuit 110 may receive a data transmitted from the remote Bluetooth device 102 through the second Bluetooth circuit 120.

In the operation 222, the third Bluetooth circuit 130 indirectly communicates data with the remote Bluetooth device 102 through the second Bluetooth circuit 120. For example, the third Bluetooth circuit 130 may transmit a data to be transmitted to the remote Bluetooth device 102 to the data transmission circuit 123 of the second Bluetooth circuit 120, and then the second Bluetooth circuit 120 would forward the data to the remote Bluetooth device 102. For another example, the third Bluetooth circuit 130 may receive a data transmitted from the remote Bluetooth device 102 through the second Bluetooth circuit 120.

As a result, during the subsequent operation of the multi-member Bluetooth device 100, the second Bluetooth circuit 120 is the only member circuit that directly communicates data with the remote Bluetooth device 102, while each of the other member circuits would instead indirectly communicate data with the remote Bluetooth device 102 through the second Bluetooth circuit 120. In other words, the second Bluetooth circuit 120 replaces the first Bluetooth circuit 110 to act as the signal relay device between other member circuits and the remote Bluetooth device 102 in this situation.

Please note that the executing order of the operations in FIG. 2 is merely an example embodiment, rather than a restriction to the practical implementations. For example, the aforementioned operations of transmitting the device identification data of the first Bluetooth circuit 110, the Bluetooth connection parameters between the first Bluetooth circuit 110 and the remote Bluetooth device 102, and the handover instruction to the second Bluetooth circuit 120 are simultaneously performed in the operation 212, but the above data, parameters, and instruction may be separately transmitted at different points of time in practical applications.

In some embodiments or applications, the first Bluetooth circuit 110 may skip the determining operation of the operation 210 and directly proceed with the operation 212 when the first Bluetooth circuit 110 play the role of the signal relay device in order to achieve some specific application purposes. For example, when the first Bluetooth circuit 110 is about to enter into a specific operating mode (e.g., entering into a power saving mode, entering into a firmware auto-update mode, or going to reboot), the control circuit 115 may actively request one of the other member circuits (e.g., the second Bluetooth circuit 120) to replace the first Bluetooth circuit 110 for directly communicating data with the remote Bluetooth device 102, so as to take over the role of signal relay device. That is, the control circuit 115 is not restricted by the determining result made by the determining circuit 117 at that time. In this situation, the first Bluetooth circuit 110 equivalently skips the operation 210 and directly jump to the operation 212.

Furthermore, the quantity of the member circuits in the multi-member Bluetooth device 100 may be reduced to two, or may be increased depending on the requirement of practical circuit applications.

The architecture and operations of the disclosed multi-member Bluetooth device 100 may be applied to various devices or systems adopting the Bluetooth transmission mechanism, such as a pair of Bluetooth earphones, a group of Bluetooth speakers, a group of virtual reality devices, a group of Bluetooth tire-pressure sensors, an IoT (Internet of Things) system comprising multiple IoT unit circuits, or the like. The remote Bluetooth device 102 may be realized by various appropriate devices having the Bluetooth transmission capability, such as a desktop computer, a notebook computer, a tablet computer, a cell phone, a smart watch, a VR (virtual reality) image signal generating device, smart speakers, a smart television, a vehicle electronic device, an IoT transceiving circuit, or the like.

As can be appreciated from the foregoing descriptions that the first Bluetooth circuit 110 first plays the role of signal relay device in the multi-member Bluetooth device 100 to directly conducts Bluetooth communication with the remote Bluetooth device 102, and acts as a data communication bridge between the remote Bluetooth device 102 and other member circuits. After the first Bluetooth circuit 110 played the role of signal relay device for a period of time, the control circuit 115 of the first Bluetooth circuit 110 would instruct the second Bluetooth circuit 120 to play the role of signal relay device in the subsequent operation, and to replace the first Bluetooth circuit 110 by utilizing the device identification data and the Bluetooth connection parameters of the first Bluetooth circuit 110 so as to directly conduct Bluetooth communication with the remote Bluetooth device 102 in the name of the first Bluetooth circuit 110, to thereby act as the data communication bridge between the remote Bluetooth device 102 and other member circuits.

The aforementioned approach that the first Bluetooth circuit 110 hands over the role of signal relay device to the second Bluetooth circuit 120 can effectively reduce the computing loading, the power consumption, or the heat generation of the first Bluetooth circuit 110.

Additionally, by directly communicating data with the remote Bluetooth device 102 in the name of the first Bluetooth circuit 110, the second Bluetooth circuit 120 does not need to reestablish a new Bluetooth connection with the remote Bluetooth device 102, thereby effectively preventing the member circuits of the multi-member Bluetooth device 100 from encountering signal interruption.

In other words, the first Bluetooth circuit 110 is able to seamlessly hand over the role of signal relay device to the second Bluetooth circuit 120 by adopting the method of FIG. 2 without the need of asking for a permission from the remote Bluetooth device 102 in advance.

From another aspect, in the multi-member Bluetooth device 100, the member circuit currently acting as the signal relay device (hereinafter, referred to as a main Bluetooth circuit) may select another member circuit (hereinafter, referred to as an auxiliary Bluetooth circuit) at an appropriate point of time to play the role of signal relay device in the subsequent operation. In addition, the main Bluetooth circuit can also flexibly decide the timing at which the auxiliary Bluetooth circuit replaces the main Bluetooth circuit for directly conducting Bluetooth communication with the remote Bluetooth device 102.

Therefore, the multi-member Bluetooth device 100 is capable of achieving various management mechanisms, such as load balancing, power consumption balancing, heat generation balancing among the multiple member circuits by adopting the method of FIG. 2, thereby improving the overall performance of the multi-member Bluetooth device 100, increasing the durability of the Bluetooth circuit, or improving the user experiences.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A multi-member Bluetooth device (100) for communicating data with a remote Bluetooth device (102), the multi-member Bluetooth device (100) comprising:
   a main Bluetooth circuit (110), comprising:
   a first Bluetooth communication circuit (111);
   a first data transmission circuit (113);
   a first control circuit (115) arranged to operably communicate data with the remote Bluetooth device (102) through the first Bluetooth communication circuit (111) by utilizing a Bluetooth wireless transmission approach, and arranged to operably communicate data with other devices through the first data transmission circuit (113); and
   a first determining circuit (117) coupled with the first control circuit (115) and the first data transmission circuit (113), and arranged to operably evaluate a computing loading of the main Bluetooth circuit (110), a temperature of the main Bluetooth circuit (110), or an operating environment of the main Bluetooth circuit (110), and further arranged to operably receive indication messages regarding a computing loading, a temperature, or an operating environment of the auxiliary Bluetooth circuit (120) transmitted from the auxiliary Bluetooth circuit (120) through the first data transmission circuit (113); and
   an auxiliary Bluetooth circuit (120), comprising:
   a second Bluetooth communication circuit (121);
   a second data transmission circuit (123); and
   a second control circuit (125) arranged to operably control the second data transmission circuit (123) to communicate data with the first data transmission circuit (113), so as to indirectly communicate data with the remote Bluetooth device (102) through the main Bluetooth circuit (110);
   wherein the first control circuit (115) transmits a device identification data of the main Bluetooth circuit (110) and multiple Bluetooth connection parameters between the main Bluetooth circuit (110) and the remote Bluetooth device (102) to the second data transmission circuit (123) through the first data transmission circuit (113);
   when the second control circuit (125) received instructions from the main Bluetooth circuit (110), the second control circuit (125) controls the second Bluetooth communication circuit (121) to directly communicate data with the remote Bluetooth device (102) in the name of the main Bluetooth circuit (110) by utilizing the device identification data and the multiple Bluetooth connection parameters; and
   the first control circuit (115) then controls the first data transmission circuit (113) to communicate data with the second data transmission circuit (123), so as to indirectly communicate data with the remote Bluetooth device (102) through the auxiliary Bluetooth circuit (120);
   wherein when the computing loading of the main Bluetooth circuit (110) exceeds the computing loading of the auxiliary Bluetooth circuit (120) for a predetermined degree, the temperature of the main Bluetooth circuit (110) exceeds the temperature of the auxiliary Bluetooth circuit (120) for a predetermined degree, or the operating environment of the main Bluetooth circuit (110) deviates from corresponding predetermined conditions but the operating environment of the auxiliary Bluetooth circuit (120) matches corresponding predetermined conditions, the first determining circuit (117) notifies the first control circuit (115) so that the first control circuit (115) instructs the auxiliary Bluetooth circuit (120) through the first data transmission circuit (113) to replace the main Bluetooth circuit (110) by utilizing the device identification data and the multiple Bluetooth connection parameters for directly communicating data with the remote Bluetooth device (102), and wherein when the second Bluetooth communication circuit (121) directly communicates data with the remote Bluetooth device (102) in the name of the main Bluetooth circuit (110), the first control circuit (115) controls the first Bluetooth communication circuit (111) to stop directly communicating data with the remote Bluetooth device (102).

2. The multi-member Bluetooth device (100) of claim 1, wherein the first control circuit (115) transmits the device identification data and the multiple Bluetooth connection parameters to the auxiliary Bluetooth circuit (120) through the first data transmission circuit (113) when the first control circuit (115) instructs the auxiliary Bluetooth circuit (120) to replace the main Bluetooth circuit (110) for directly communicating data with the remote Bluetooth device (102).

3. The multi-member Bluetooth device (100) of claim 1, wherein the device identification data comprises at least one of following data:

a sync word utilized by the main Bluetooth circuit (110), a Bluetooth address of the main Bluetooth circuit (110), a logical transport address of the main Bluetooth circuit (110), an access address of the main Bluetooth circuit (110), and an advertising device address of the main Bluetooth circuit (110).

4. The multi-member Bluetooth device (100) of claim 1, wherein the multiple Bluetooth connection parameters comprise at least one of following parameters:

a piconet clock, an adaptive frequency hopping map (AFH map), a link key, an encryption key, an anchor point instant, a connection counter, a connection interval, a channel map, a long term key, a session key, an initialization vector, a CCM counter, an advertising interval, and a vendor specific timing data.

5. The multi-member Bluetooth device (100) of claim 1, wherein during a period in which the first Bluetooth communication circuit (111) directly communicates data with the remote Bluetooth device (102), the second Bluetooth communication circuit (121) does not directly communicate data with the remote Bluetooth device (102); while during a period in which the second Bluetooth communication circuit (121) directly communicates data with the remote Bluetooth device (102), the first Bluetooth communication circuit (111) does not directly communicate data with the remote Bluetooth device (102).

6. A main Bluetooth circuit (110) of a multi-member Bluetooth device (100), the multi-member Bluetooth device (100) being utilized for communicating data with a remote Bluetooth device (102) and comprising the main Bluetooth circuit (110) and an auxiliary Bluetooth circuit (120), the main Bluetooth circuit (110) comprising:

a Bluetooth communication circuit (111);

a data transmission circuit (113);

a control circuit (115) arranged to operably communicate data with the remote Bluetooth device (102) through the Bluetooth communication circuit (111) by utilizing a Bluetooth wireless transmission approach, and arranged to operably communicate data with the auxiliary Bluetooth circuit (120) through the data transmission circuit (113), so that the auxiliary Bluetooth circuit (120) is allowed to indirectly communicate data with the remote Bluetooth device (102) through the main Bluetooth circuit (110); and a determining circuit (117) coupled with the control circuit (115) and arranged to operably evaluate a computing loading of the main Bluetooth circuit (110), a temperature of the main Bluetooth circuit (110), or an operating environment of the main Bluetooth circuit (110);

wherein the control circuit (115) transmits a device identification data of the main Bluetooth circuit (110) and multiple Bluetooth connection parameters between the main Bluetooth circuit (110) and the remote Bluetooth device (102) to the auxiliary Bluetooth circuit (120) through the data transmission circuit (113), so as to enable the auxiliary Bluetooth circuit (120) to directly communicate data with the remote Bluetooth device (102) in the name of the main Bluetooth circuit (110) by utilizing the device identification data and the multiple Bluetooth connection parameters; and the control circuit (115) then indirectly communicates data with the remote Bluetooth device (102) through the auxiliary Bluetooth circuit (120);

wherein the determining circuit (117) notifies the control circuit (115) when the computing loading of the main Bluetooth circuit (110) exceeds a predetermined level, the temperature of the main Bluetooth circuit (110) exceeds a predetermined temperature, or the operating environment of the main Bluetooth circuit (110) deviates from a predetermined condition, so that the control circuit (115) instructs the auxiliary Bluetooth circuit (120) through the data transmission circuit (113) to replace the main Bluetooth circuit (110) by utilizing the device identification data and the multiple Bluetooth connection parameters for directly communicating data with the remote Bluetooth device (102), when the auxiliary Bluetooth circuit (120) directly communicates data with the remote Bluetooth device (102) in the name of the main Bluetooth circuit (110), the control circuit (115) controls the Bluetooth communication circuit (111) to stop directly communicating data with the remote Bluetooth device (102).

7. The main Bluetooth circuit (110) of claim 6, wherein after the main Bluetooth circuit (110) directly communicates data with the remote Bluetooth device (102) for a period of time, the control circuit (115) instructs the auxiliary Bluetooth circuit (120) to replace the main Bluetooth circuit (110) by utilizing the device identification data and the multiple Bluetooth connection parameters for directly communicating data with the remote Bluetooth device (102) utilizing a Bluetooth wireless transmission approach, so as to decrease a computing loading, a power consumption, or a resulting heat of the main Bluetooth circuit (110), or to avoid the auxiliary Bluetooth circuit (120) from signal interruption caused by reestablishing a Bluetooth connection with the remote Bluetooth device (102) in the name of the auxiliary Bluetooth circuit (120).

8. The main Bluetooth circuit (110) of claim 7, wherein the auxiliary Bluetooth circuit (120) does not need to ask for a permission from the remote Bluetooth device (102) before directly communicating data with the remote Bluetooth device (102) in the name of the main Bluetooth circuit (110) by utilizing the device identification data and the multiple Bluetooth connection parameters.

9. A main Bluetooth circuit (110) of a multi-member Bluetooth device (100), the multi-member Bluetooth device (100) being utilized for communicating data with a remote Bluetooth device (102) and comprising the main Bluetooth circuit (110) and an auxiliary Bluetooth circuit (120), the main Bluetooth circuit (110) comprising:

a Bluetooth communication circuit (111);

a data transmission circuit (113);

a control circuit (115) arranged to operably communicate data with the remote Bluetooth device (102) through the Bluetooth communication circuit (111) by utilizing a Bluetooth wireless transmission approach, and arranged to operably communicate data with the auxiliary Bluetooth circuit (120) through the data transmission circuit (113), so that the auxiliary Bluetooth circuit (120) is allowed to indirectly communicate data with the remote Bluetooth device (102) through the main Bluetooth circuit (110); and a determining circuit (117) coupled with the control circuit (115) and the first data transmission circuit (113), and arranged to operably evaluate a computing loading of the main Bluetooth circuit (110), a temperature of the main Bluetooth circuit (110), or an operating environment of the main Bluetooth circuit (110), and further arranged to operably receive indication messages regarding a computing loading, a remaining power, a temperature, or an operating environment of the auxiliary Bluetooth circuit (120) transmitted from the auxiliary Bluetooth circuit (120) through the data transmission circuit (113);

wherein the determining circuit (117) notifies the control circuit (115) when the computing loading of the main Bluetooth circuit (110) exceeds the computing loading of the auxiliary Bluetooth circuit (120) for a predetermined degree, the temperature of the main Bluetooth circuit (110) exceeds the temperature of the auxiliary Bluetooth circuit (120) for a predetermined degree, or the operating environment of the main Bluetooth circuit (110) deviates from corresponding predetermined conditions but the operating environment of the auxiliary Bluetooth circuit (120) matches corresponding predetermined conditions, so that the control circuit (115) instructs the auxiliary Bluetooth circuit (120) through the data transmission circuit (113) to replace the main Bluetooth circuit (110) by utilizing the device identification data and the multiple Bluetooth connection parameters for directly communicating data with the remote Bluetooth device (102), when the auxiliary Bluetooth circuit (120) directly communicates data with the remote Bluetooth device (102) in the name of the main Bluetooth circuit (110), the control circuit (115) controls the Bluetooth communication circuit (111) to stop directly communicating data with the remote Bluetooth device (102).

10. The main Bluetooth circuit (110) of claim 9, wherein the control circuit (115) transmits the device identification data and the multiple Bluetooth connection parameters to the auxiliary Bluetooth circuit (120) through the data transmission circuit (113) when the control circuit (115) instructs the auxiliary Bluetooth circuit (120) to replace the main Bluetooth circuit (110) for directly communicating data with the remote Bluetooth device (102).

11. The main Bluetooth circuit (110) of claim 9, wherein the device identification data comprises at least one of following data:

a sync word utilized by the main Bluetooth circuit (110), a Bluetooth address of the main Bluetooth circuit (110), a logical transport address of the main Bluetooth circuit (110), an access address of the main Bluetooth circuit (110), and an advertising device address of the main Bluetooth circuit (110).

12. The main Bluetooth circuit (110) of claim 9, wherein the multiple Bluetooth connection parameters comprise at least one of following parameters:

a piconet clock, an adaptive frequency hopping map (AFH map), a link key, an encryption key, an anchor point instant, a connection counter, a connection interval, a channel map, a long term key, a session key, an initialization vector, a CCM counter, an advertising interval, and a vendor specific timing data.

13. The main Bluetooth circuit (110) of claim 9, wherein during a period in which the Bluetooth communication circuit (111) directly communicates data with the remote Bluetooth device (102), the auxiliary Bluetooth circuit (120) does not directly communicate data with the remote Bluetooth device (102); while during a period in which the auxiliary Bluetooth circuit (120) directly communicates data with the remote Bluetooth device (102), the Bluetooth communication circuit (111) does not directly communicate data with the remote Bluetooth device (102).

* * * * *